(12) United States Patent
Lumme et al.

(10) Patent No.: US 6,587,693 B1
(45) Date of Patent: Jul. 1, 2003

(54) E-MAIL TRAFFIC IN A MOBILE COMMUNICATIONS SYSTEM

(75) Inventors: Martti Lumme, Helsinki (FI); Lassi Hippelainen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/485,268

(22) PCT Filed: Aug. 31, 1998

(86) PCT No.: PCT/FI98/00675

§ 371 (c)(1),
(2), (4) Date: Feb. 7, 2000

(87) PCT Pub. No.: WO99/12364

PCT Pub. Date: Mar. 11, 1999

(30) Foreign Application Priority Data

Sep. 1, 1997 (FI) .................................................. 973575

(51) Int. Cl.⁷ .............................................. H04Q 7/20
(52) U.S. Cl. ...................... 455/466; 455/426; 455/456; 455/412; 455/413; 455/435; 370/407; 709/217; 707/10
(58) Field of Search ................................ 455/466, 412, 455/413, 426, 435, 455, 456; 707/2, 3, 4, 7, 10; 709/217; 370/401

(56) References Cited

U.S. PATENT DOCUMENTS

| | | | | |
|---|---|---|---|---|
| 5,946,629 A | * | 8/1999 | Sawyer et al. | 455/426 |
| 6,009,008 A | * | 12/1999 | Pelly | 363/125 |
| 6,138,158 A | * | 10/2000 | Boyle et al. | 709/206 |
| 6,178,331 B1 | * | 1/2001 | Holmes et al. | 455/412 |
| 6,230,002 B1 | * | 5/2001 | Floden et al. | 455/411 |
| 2002/0006803 A1 | * | 1/2002 | Mendiola et al. | 455/466 |

FOREIGN PATENT DOCUMENTS

| | | | |
|---|---|---|---|
| EP | 0 777 394 A1 | | 6/1997 |
| FI | WO 9811744 | * | 3/1998 |
| FI | 963659 | | 11/2001 |
| SE | WO 9912365 | * | 3/1999 |
| WO | 97/08906 A1 | | 3/1997 |
| WO | 97/32439 A2 | | 9/1997 |
| WO | 97/36434 A1 | | 10/1997 |

* cited by examiner

*Primary Examiner*—Nguyen T. Vo
*Assistant Examiner*—Sujatha Sharma
(74) *Attorney, Agent, or Firm*—Pillsbury Winthrop LLP

(57) ABSTRACT

The addresses of a mobile station (MS) and a second party (B) connected to the Internet (12) are converted in such a way that a short message service center (SMSC) receives an allocation request (2-1) from a mobile station for allocating a virtual number (VN) to a combination comprising the address ($IA_B$) of a second party preferably also a mobile station identifier. The SMSC sends a reply (2-2) to the mobile station, the reply indicating the allocated virtual number (VN). The mobile station (MS) transmits a short message (2-9) to the virtual member. The SMSC forms an Internet address ($IA_B$) of the second party (B) on the basis of the virtual number (VN) and the allocation request (2-1) and sends to the Internet address an e-mail message (2-10) whose text part corresponds to the text part of the short message. The B party can reply (2-11) by using the reply function of the e-mail, which exchanges the sender for the recipient The B party can also use (2-13) the ISDN number of the mobile station. In both cases (2-12, 2-14) a virtual number (VN) is sent to the mobile station (MS), the number indicating the sender to the user of the mobile station.

16 Claims, 3 Drawing Sheets

E-MAIL TRAFFIC IN A MOBILE COMMUNICATIONS SYSTEM

This application is the national phase of international application PCT/FI98/00675 filed Aug. 31, 1998, which designated the U.S.

BACKGROUND ART

The invention relates to transmitting electronic mail (e-mail) between the Internet and a mobile station.

The invention is described in connection with a GSM system (or its derivatives, such as a DCS/GSM1800), at first with reference to FIG. 1. The user of a mobile station (MS) communicates with a Mobile Switching Centre MSC through a Base Station Subsystem BSS, and with other mobile stations through the MSC, or with terminals of a wired network through a Public Switching Telephone Network PSTN. A Short Message Service Centre SMSC through which text messages, i.e. short messages, can be transmitted and received, is connected to the GSM system.

The use of Internet in transmitting e-mail is rapidly becoming popular. FIG. 1 illustrates an e-mail server 13 connected to the Internet 12, and a personal computer B connected to this server (e.g. through a local area network). (Reference B refers to a second party of a call, i.e. what is known as subscriber B.) A light and easily portable mobile station would in many respects be an ideal terminal for using e-mail.

A problem is the incompatibility between the short message function of the GSM system and Internet concerning e-mail addresses. As is known, in the GSM system short messages are transmitted using the recipient's ISDN number. The length of a short message is limited to 160 characters. The recipient's ISDN number is not included in these 160 characters. In the Internet the e-mail addresses are of the following format: "user@server.domain". Here the "user" typically stands for a person's first name and surname, the "server" consists of the name of a company or an organization and the "domain" represents the naming domain of servers indicating the type of organization (for example ".com", "org" etc) or the country ID (for example ".fi", ".de", etc). In FIG. 1 such Internet addresses are for instance the address of the short message service centre SMSC $IA_{SMSC}$ "smsc.operator.domain", the address of the e-mail server 13 "server.domain" and computer B in its domain and having the address $IA_B$ "pc.user@server.domain".

Using Internet addresses in connection with a short message function causes several problems. As prior art methods allow such an address to be transmitted only as a part of the short message contents, this would use the maximum length of the short message (as much as tens of charactLers), which in all is 160 characters. In addition, the input of long user IDs and special characters (such as @) from a mobile station keyboard is known to be difficult. Furthermore, the address books, or address lists, of current mobile stations are not designed to store Internet-formatted e-mail addresses. A further problem is that the user of computer B cannot use the reply function of the e-mail program, as the identifier of the mobile station MS and the Internet address of computer B are incompatible.

BRIEF DESCRIPTION OF THE INVENTION

An intermediate object of the invention is to create a method and an equipment for implementing the method of converting the addresses between the short message function of a mobile communication system and the Internet. The intermediate object is achieved with a method and a system which are characterized in what is disclosed in the independent claims. A main object of the invention and preferred embodiments of the intermediate object are achieved with the methods and systems that are disclosed in the dependent claims.

The idea of the invention is that a virtual number is reserved for the Internet-format e-mail address. It is called a virtual subscriber number (a virtual number VN for short), as it is not directly associated with a physical subscriber or a terminal. The virtual subscriber number is converted into an Internet address in the fixed part of the mobile communication system, most conveniently in the short message service centre.

It is highly preferable that the virtual numbers are allocated to combinations comprising both the ID of the mobile station (MSISDN) and the Internet address of subscriber B. It is thus possible to use the same virtual numbers for different mobile stations, a few characters sufficing as the length of an individual virtual number. If the length of a virtual number is three digits, each mobile station can have 1000 such combinations at its disposal. Three digits (and a possible space or another separator in the mobile terminating messages) do not take up much of the maximum length of the short message. If several mobile stations use the same virtual number, the right recipient can in any case be deduced, as two identical combinations cannot exist. Another advantage of this kind of combinations is that they help verifying the ID of the sender of the message. An unauthorized person cannot exploit a virtual number possibly known to him.

The invention provides a flexible mechanism for creating addresses between the short message function of a mobile communication system and the Internet. A mechanism as described in the invention takes up only a very small part of the maximum length of a mobile terminating short message, i.e. the number of characters equalling the length of the virtual number. An addressing mechanism of the invention does not take up any of the length of a mobile originating short message. Furthermore, the addressing mechanism of the invention is fully compatible with current mobile stations and their address books.

BRIEF DESCRIPTION OF THE DRAWINGS

In the following, the invention will be described in greater detail in connection with the preferred embodiments and with reference to the accompanying drawings, in which.

DETAILED DESCRIPTION OF THE INVENTION

Figure 1:
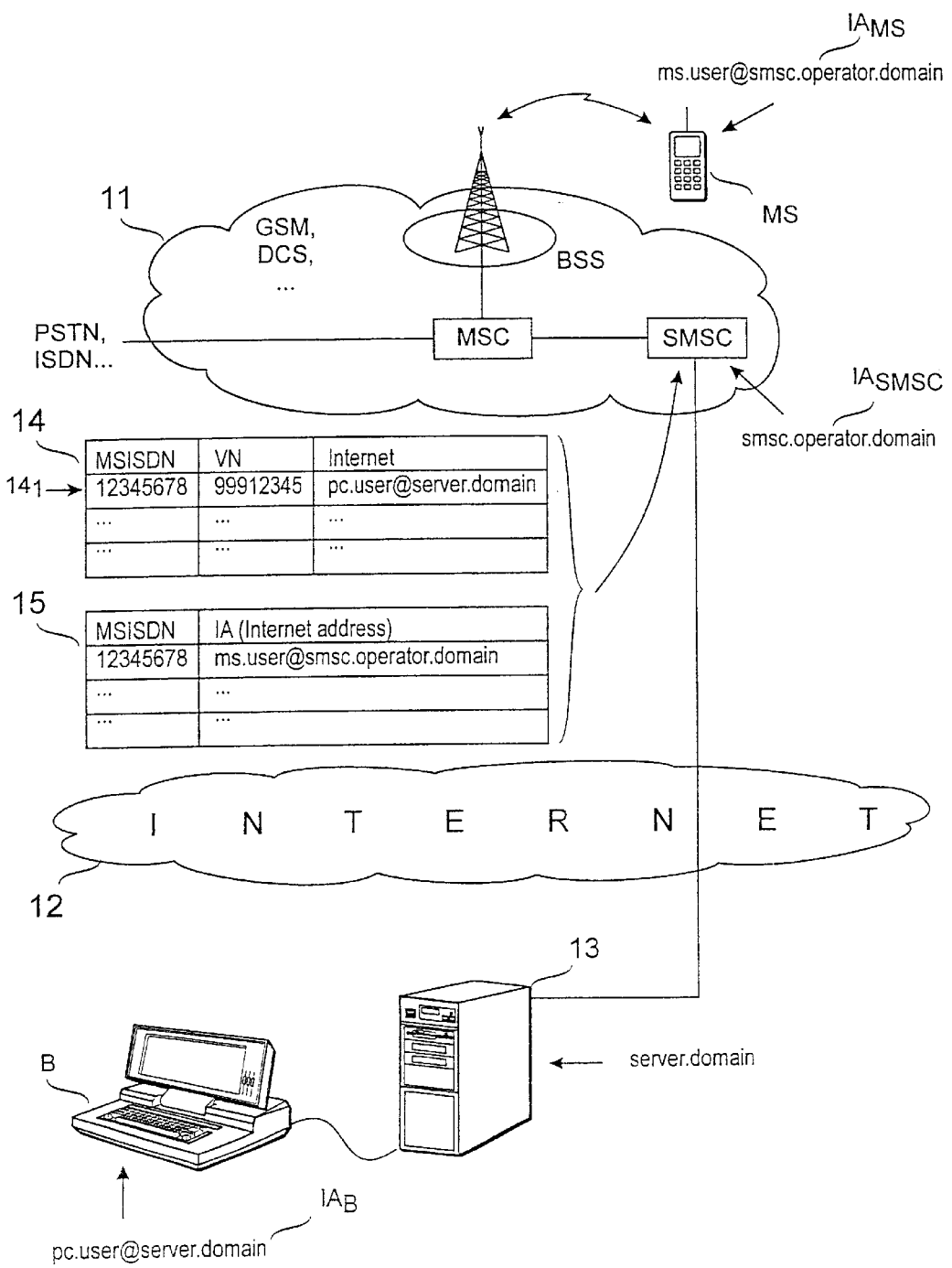
FIG. 1 shows a diagram of telecommunication system and tables included in a short message service centre of the invention.
Figure 2:
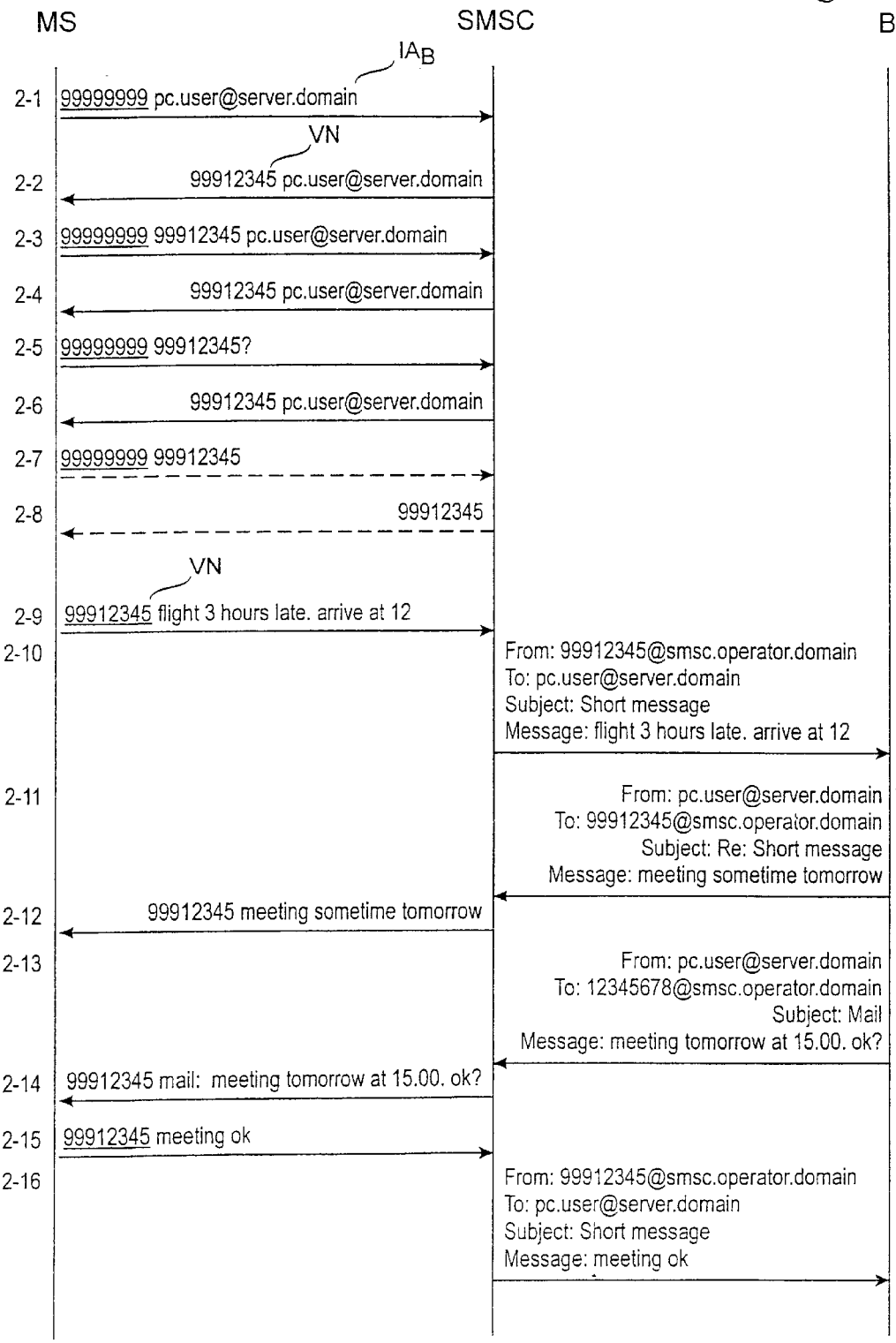
FIGS. 2 and 3 show e-mail transmission in accordance with the invention between a mobile station and a B party.

Referring to FIGS. 1 and 2, the examples and the Figures assume that the subscriber number of a mobile station MS is "12345678", the Internet address $IA_B$ of the B party is "pc.user @server.domain", the virtual number VN allocated to this combination is "99912345", and the Internet address $IA_{SMSC}$ of the short message service centre SMSC is "smsc.operator.domain" and its command port is "99999999". The short message service centre SMSC and the server 13 of subscriber B may naturally be in different domains (i.e. their domain names may be different). In FIGS.

2 and 3, the underlined numbers (99999999 and 99912345) function as short message addresses, and are not part of the short message proper (they do not consume its maximum net length).

Furthermore, for the sake of simplicity and clarity, it is assumed in the following examples that the functionality of the invention is integrated into the short message service centre SMSC of the mobile communications system. Corresponding functions can naturally be implemented in one or several separate network elements that are functionally connected to the short message service centre. Such a supplementary network element can be more advantageous if the network comprises a short message service centre previously supplied by one provider, and the intention is to add additional features supplied by another provider. In this case a short message service centre signifies the particular combination formed by the actual short message service centre and the changes of the invention associated with the separate network elements.

Steps 2-1 to 2-8 show how the address book can be managed. Table 14 for linking the ISDN number of the mobile station MS, the virtual number VN and the Internet address of the second party is associated with the short message service centre SMSC. Reference $14_1$ illustrates one such combination. In step 2-1 the mobile station MS requests the short message service centre SMSC to allocate a virtual number for the Internet address of the B party. The allocation request is a short message transmitted to the port of the short message service centre SMSC (to number 99999999). This short message comprises the Internet address $IA_B$ of the B party (here pc.user@server.domain). In step 2-2 the short message service centre SMSC allocates a virtual number VN (here 99912345) to the pair formed by B and the mobile station MS, and enters the information in table 14 (here on line $14_1$). The short message service centre SMSC sends this virtual number VN and (as a precaution) the Internet address $IA_B$ of B (here pc.user@server.domain) to the mobile station. If the short message service centre SMSC is not previously familiar with B's address, it allocates an unused number to B. The mobile station is now able to use the virtual number 99912345 for indicating the B party concerned.

Steps 2-3 and 2-4 show how the user of a mobile station MS can modify the Internet address $IA_B$ associated with a virtual number VN. In step—2-3 the mobile station MS requests the short message service centre SMSC to link the virtual number 99912345 and the Internet address pc.user@server.domain of B. In step 2-4 the short message service centre confirms having done so.

In step 2-5 the mobile station inquires the short message service centre to whom a particular subscriber number has been allocated. In its simplest form the inquiry is a virtual number and a character indicating an inquiry, most preferably a question mark. The short message service centre replies in step 2-6.

In step 2-7 the mobile station asks the short message service centre to delete the Internet address associated with the virtual number 99912345. The simplest way to do this is for an empty Internet address to follow the virtual number. In step 2-8 the short message service centre confirms having done so. This virtual number is then free to be used for other purposes. (In a real situation an address naturally has to be deleted last, which is why the corresponding arrows in FIG. 2 have been drawn in dashed lines.)

Steps 2-9 to 2-16 show the actual e-mail traffic so that in the steps 2-9 to 2-12 the mobile station MS transmits a message to which subscriber B replies, and, correspondingly, in the steps 2-13 to 2-16 subscriber B transmits a message to which the mobile station MS replies. In order to illustrate the description, a typical example of the use of e-mail and short messages is described, in which the user of the mobile station MS wishes to inform his secretary (B) that he will be late for a scheduled meeting. The secretary first replies that she will have to reschedule the meeting for the following day. Later the secretary sends a new e-mail message, in which she informs the precise time of the meeting. Finally, the user of the mobile station MS sends a reply to this message.

In step 2-9 the mobile station MS transmits e-mail to subscriber B. This is performed by transmitting a short message whose contents correspond to the contents of an intended e-mail. The short message is transmitted to the virtual number VN (here 99912345) that the short message service centre (in step 2-2) allocated to the pair formed by subscriber B and the mobile station. In step 2-10 the short message service centre SMSC retrieves from table 14 the Internet address of the B party corresponding to the mobile station MS concerned and the virtual number 99912345. It then forms the e-mail message and transmits it to B for example in the following manner. In order to form a sender field ("from") for the e-mail, the virtual number concerned 99912345 is joined to the domain of the Internet address $IA_{SMSC}$ of the short message service centre SMSC, here smsc.operator.domain. The address thus becomes: 99912345@smsc.operator.domain. The recipient ("to") is the Internet address pc.user@server.domain of the B party. The subject of the e-mail message may indicate that a short message is concerned. The contents of the e-mail message will thus be the contents of the short message.

In step 2-11 B replies to the mobile station MS. The reply is initiated by sending an e-mail message to the Internet address of the short message service centre SMSC. As a reply message is concerned, the sender is the same as the recipient in step 2-10 and vice versa. B can thus use the reply function of the e-mail program. The subject of the message may indicate that the subject concerns a short message. The reply written by subscriber B is the contents of the message. In step 2-12 the short message service centre retrieves from table 14 the number of the mobile station MS (here 12345678) corresponding to the virtual number VN (here 99912345) of the mobile station and to the Internet address of the sender (here pc.user@server.domain). The short message service centre SMSC transmits to this number a short message comprising the virtual number 99912345 and the text part of the e-mail message received in the previous step. By means of the virtual number and the address book, the user of the mobile station MS can, if necessary, deduce who the sender of the message is. If the combined length of the virtual number and the reply message exceeds the maximum length of the short message (160 characters), the excess can be transmitted in a second short message.

In step 2-13 B has organized a meeting for the following day at 15.00 hours and wishes to know if the time is suitable for the user of the mobile station MS. B sends an e-mail message. In this case B does not use the virtual number 99912345 allocated by the short message service centre (as B does not reply to an e-mail but sends a new message and as it is more convenient for B to use the telephone book of the e-mail program for obtaining the mobile station MS number 12345678). The recipient's address is formed by joining the number 12345678 to the domain of the Internet address smsc.operator.domain of the short message service centre SMSC (i.e. keying in 12345678@smsc.operator.domain). The subject field can be "mail". In the message a meeting is proposed for the following day at 15.00 hours and a confirmation is requested. In step 2-14 the short message service centre searches from table 14 the virtual number 99912345 corresponding to the number 12345678 of the mobile station and the Internet address pc.user@server.domain of the sender B. The short message service centre SMSC then forms the short message by joining the virtual number concerned 99912345 with the text part of the e-mail message (received in step 2-13). By means of the virtual number the user of the mobile station MS is able to conclude who the sender is. In steps 2-15 and 2-16 the user of the mobile station MS confirms that the time of the meeting is convenient. Technically these steps correspond to steps 2-9 and 2-10, explained above.

It is assumed in step 2-14 that the virtual number concerned was previously allocated to this sender-recipient pair. If this is not the case, the short message service centre SMSC is able to allocate an available number. Consequently, the process could also begin with a message subscriber B sends to the mobile station MS. In this case, if the aim is to maximize the information obtained by the user of the mobile station, the short message service centre SMSC sends to the mobile station the e-mail address and the virtual number VN allocated to subscriber B. The short message service centre is able to send this piece of information as a separate short message corresponding to the message 2-2 (or 2-6) described above. Alternatively, the e-mail address of subscriber B and the virtual number VN allocated to subscriber B can be attached to the same e-mail message carrying the actual text part, if their combined length does not exceed the maximum length of a short message. If, in turn, the aim is to minimize message traffic, an extra short message can be avoided by the short message service centre sending only the virtual number VN it has allocated. The message is similar to the message 2-14 explained above, but the virtual number VN (99912345) is new to the user of the mobile station. If the text part of the message does not indicate who the sender is, the user of the mobile station can send an inquiry in a similar way as explained above in connection with message 2-5.

Figure 3:
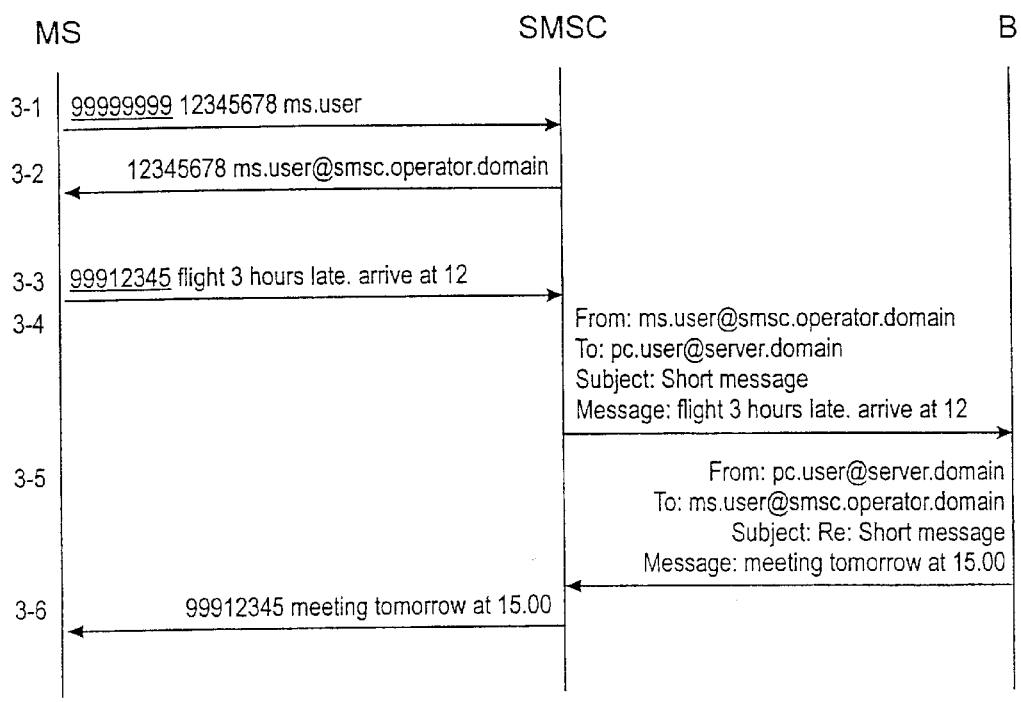

Referring now also to FIG. 3, an extended embodiment of the invention is described, in which also the user of a mobile station MS can be identified on the basis of an Internet-format ID (an Internet address). In addition, table 15 which links the ISDN number of the mobile station MS and the Internet address $IA_{MS}$ of the same mobile station, has been associated with the short message service centre SMSC. In step 3-1 the mobile station MS transmits to the command port 99999999 of the short message service centre a short message comprising the number of the mobile station 12345678 and a name selected by its user; "ms.user" in this example. In step 3-2 the short message service centre SMSC stores this information in table 15 and sends a reply confirming that it has linked the number 12345678 and the Internet-formatted name ms.user. A complete Internet address is obtained by keying in the name "ms.user" selected by the user of the mobile station in the domain of the Internet address of the short message service centre, i.e. ms.user@smsc.operator.domain. If the name ms.user is reserved for another mobile station, the short message service centre cannot allocate it to this particular mobile station. The short message service centre informs about this for example by sending the old Internet-formatLted address of the mobile station concerned, if such an address exists. If not, the short message service centre can reply by sending the ISDN number 12345678 of the mobile station only.

In steps 3-3 and 3-4 the user of the mobile station MS transmits a message to subscriber B, who sends a reply in step 3-5 and 3-6. As regards the contents, these steps correspond to steps 2-9 to 2-13. However, there is a difference in addressing these messages. Having received a short message in step 3-3, the short message service centre SMSC searches table 15 to find out if an Internet address has been allocated to the transmitting mobile station MS. In this case an address has been allocated, and the short message service centre finds the name ms.user next to the number 12345678 in table 15 and uses the Internet address ms.user@smsc.operator.domain of the mobile station MS in the sender field ("from") in step 3-4.

In the reverse direction, in steps 3-5 and 3-6, the SMSC again uses table 15 and detects that the ISDN number 12345678 corresponds to the Internet address ms.user@smsc.operator.domain. The SMSC then (for the comfort of the user of the mobile station MS) again uses table 14 and detects that on line 14, the virtual number 99912345 corresponds to the sender-recipient pair concerned and attaches this virtual number to the short message. On the basis of the virtual number (and the address book) the user of the mobile station MS is able to deduce the sender of the message.

A conventional short message service centre is able to transmit and receive short messages between a short message service centre and a mobile station through a mobile communication system. The short message service centre in accordance with the invention is further expected to possess the ability:

to send and receive e-mail messages between the short message service centre and subscriber B through the Internet;

to identify the allocation request for the virtual number transmitted by the mobile station and comprising the Internet address of subscriber B;

to allocate the virtual number VN to subscriber B as indicated by the allocation request and to inform the mobile station about the allocated virtual number;

to identify a short message transmitted by the mobile station to the virtual number VN concerned, and to send the text part of the short message as e-mail through the Internet to the subscriber B, to whom the virtual number VN in question is allocated.

In this context a 'virtual number' (VN) refers to a number which has not directly been connected to a subscriber. 'Allocation' means that a virtual number is reserved among available numbers and is stored in memory in such a manner that the virtual number in question corresponds to subscriber B as mentioned in the allocation request. It is highly advantageous that the virtual numbers be stored as combinations comprising the ID (MSISDN) of the mobile station, the e-mail address of subscriber B and the virtual number. Consequently, the same virtual numbers can be used for different mobile stations. If several mobile stations use the same virtual number, the correct recipient can in any case be deduced as it is not possible for two similar combinations to exist. Another advantage of such combinations is that they help verifying the ID of the sender of the message. An unauthorized person cannot exploit a virtual number possibly known to him. A third advantage is that the virtual numbers can only be a few characters long.

In accordance with a preferred embodiment of the invention, the combinations further comprise a free-form text field, which may include for example a person's plain-language name. In some systems the e-mail addresses can be only eight characters long, an addition of a plain-language name thus increasing the user-friendliness and reducing the danger of confusion.

For the purpose of an extension explained in connection with FIG. 3, the short message service centre is further expected to possess the ability:

to identify the allocation request (3-1) of a user name (ms.user) transmitted by the mobile station MS;

to allocate the user name (ms.user) to the mobile station that sent the allocation request and to inform the mobile station about the success or failure of the allocation;

to send the short message transmitted by the mobile station as an e-mail message to the B party, to whom the virtual number concerned (99912345) is allocated to, in such a manner that the e-mail in question comprises the user name (ms.user) allocated to the mobile station MS concerned in the domain of the Internet address of the short message service centre (i.e.: ms.user@smsc.operator.domain);

to receive and to identify an e-mail message sent to the Internet address allocated to the mobile-station and to send its text part as a short message to the mobile station MS concerned, preferably in such a way that the short message comprises the virtual number VN (here 99912345) allocated to the combination of the mobile station MS and the B party.

These changes can be implemented by reasonably simple software changes to a known short message service centre, which is connected to the Internet and which is given the Internet address $IA_{SMSC}$. The short message service centre is provided with table 14. In the case of mobile originating messages, the Internet address $IA_B$ of subscriber B is retrieved from table 14 on the basis of the ISDN number and the virtual number VN of the mobile station. In the case of mobile terminating messages, the ISDN number of the mobile station is retrieved from table 14 on the basis of the virtual number VN and the Internet address $IA_B$ of subscriber B. All columns of the table thus function as search basis, and it is therefore preferable to index all columns of table 14. Similarly in table 15, retrieval is also performed in both directions, and it is therefore preferable to index both its columns.

Another aspect of the invention shows that the invention provides a network element of a mobile communication system, most appropriately a short message service centre, that has been adapted to support a protocol between a mobile station MS and a second party (B), the protocol comprising:

an allocation request for a virtual number, transmitted by the mobile station (MS) to allocate the virtual number (99912345) to the combination comprising the ID (12345678) of the mobile station concerned and the ID (pc.user@server.domain) of the second party shown by the allocation request;

a reply to the allocation request for a virtual number sent to the mobile station (MS) in such a manner that the reply indicates whether the allocation of the virtual number was successful or not, and if it is successful, the allocated virtual number (VN).

For sending messages from a mobile station to B party the protocol comprises:

a first short message transmitted by the mobile station (MS), having the virtual number VN as its address and comprising a first text part; and a first e-mail message, which is responsive to the first short message and which is to be sent to the B party, and whose:

sender field indicates the short message service centre SMSC and at least indirectly the mobile station MS concerned;

recipient field indicates the B party, whose address is determined on the basis of the virtual number (VN), which is the address of the first short message, and the allocation request;

text part substantially corresponds to the text part of the first short message.

For replying from B party to the mobile station MS the protocol comprises:

a second e-mail message which comprises:

a sender field indicating the B party;

a recipient field indicating the short message service centre SMSC and at least indirectly the mobile station MS; and a second text part; and a second short message, the receiving mobile station MS of which is determined at least indirectly on the basis of the recipient field of the second e-mail message; and which short message substantially comprises said second text part and preferably also the virtual number (VN) allocated to the combination concerned.

All messages of said protocol either originate from or terminate at the short message service centre SMSC. In the case shown in FIG. 2, the fact that the second e-mail message indirectly indicates the mobile station, means that the recipient field comprises, in addition to the address of the SMSC, either the number of the mobile station (12345678) or the virtual number (99912345) allocated to the combination concerned. For the purpose of the extension described in connection with FIG. 3, the protocol further comprises:

an allocation request 3-1 for an Internet address sent by the mobile station MS for allocating an Internet address $IA_{MS}$ (here: ms.usere@smsc.operator.domain) to the mobile station concerned; and a reply 3-2 to the allocation request for the Internet address, sent to the mobile station MS, the reply indicating whether the allocation was successful or not.

Further in the case illustrated in FIG. 3, the sender field of the first e-mail message 3-4 and the recipient field of the second e-mail message 3-5 comprise the Internet address (ms.user@smsc.operator.domain) of the mobile station MS.

To those skilled in the art it is obvious that the basic idea of the invention can be implemented in many different ways. Thus, numeric IP addresses could for example be used instead of Internet addresses. This would be somewhat faster, as a retrieval from a domain name server would no longer be needed. Remembering IP addresses is, however, difficult, which is why the use of Internet addresses is preferred. A short message service centre in accordance with the invention can be one network element, in which all functions are integrated, or it can be a conventional short message service centre, to which a separate expansion part has been connected. The invention and its embodiments are thus not restricted to the examples above but can be modified within the scope of the claims.

What is claimed is:

1. A method of matching the addresses of a first party, namely a mobile station connected to a mobile communication system supporting a short message function, and a second party connected to an IP (Internet protocol) network, the method comprising:

connecting a network element supporting the short message function of the mobile communication system to the IP network and assigning an IP network address to the network element; and the network element receiving an allocation request for a virtual number from the mobile station for allocating a virtual number to a combination comprising at least an address of the second party indicated in the allocation request; and in response to the allocation request for the virtual number, the network element sending a reply to the mobile station, the reply indicating the allocated virtual number if the reservation is successful.

2. A method as claimed in claim 1, wherein, in the case of a message transmitted from the mobile station to the second party:

the mobile station transmitting to the network element a first short message, which is addressed to the virtual number allocated to the combination and which comprises a first text part; and the first network element forming and IP network address of the second party on the basis of the information included in the virtual number and the allocation request, and sending to the IP network address of the second party a first e-mail message, the text part of which substantially corresponds to the first text part.

3. A method as claimed in claim 1, wherein, in the case of a message sent by the second party and terminating in the mobile station:

the second party sending to the network element a second e-mail message, a recipient field of which comprises the virtual number, and which second e-mail message includes a second text part; and the network element forming an identifier for the mobile station on the basis of the information included in the virtual number and in the allocation request, and sending a second short message to the mobile station comprising as much as possible of the second text part.

4. A method as claimed in claim 3, wherein the text part of the second short message also comprises the virtual number.

5. A method as claimed in claim 1, wherein in the case of a message sent from the second party to the mobile station:

the second party sending to the network element a third e-mail message, a recipient field of which comprises the identifier of the mobile station and which third e-mail message comprises a third party text; and if a virtual number has been allocated to the combination comprising the address of the second party, the network element transmitting to the mobile station a third short message, the text part of which comprises the virtual number and as much as possible of the third party text.

6. A method as claimed in claim 1, wherein the combination also comprises an identifier of the mobile station.

7. A method as claimed in claim 6, wherein the combination also comprises a free-form text field.

8. A method as claimed in claim 1, further comprising:

the mobile station sending to the network element an allocation request for allocating an IP network address to the mobile station; and in response to the allocation request, the network element sending to the mobile station a reply, which indicates whether the allocation of the IP network address is successful or unsuccessful; and that a sender field of said first e-mail message and a recipient field of the second e-mail message comprise the IP network address allocated to the mobile station.

9. A network element of a mobile communication system, which is adapted to support a protocol for sending messages between a mobile station and a second party through the network element, wherein:

the network element is connectable to the IP network; and the protocol comprises:

an allocation request for a virtual number, transmitted by the mobile station, in order to allocate a virtual number for a combination comprising at least an address of a second party indicated by the allocation request;

a reply to the allocation request for the virtual number, sent to the mobile station, the reply indicating whether the reservation of the virtual number is successful or unsuccessful, and if it is successful, the virtual number allocated.

10. A network element as claimed in claim 9, wherein, in order to support message traffic from the mobile station to the second party the protocol further comprises:

a first short message transmitted by the mobile station, having the virtual number as its address and comprising a first text part; and a first e-mail message, which is responsive to the first short message and which is to be sent to the second party, the first e-mail message comprising:

a sender field indicating the network element and at least indirectly the mobile station concerned;

a recipient field indicating said second party the address of which is determined on the basis of the virtual number that is the address of the first short message and the allocation request;

a text part substantially corresponding to the text part of the first short message.

11. A network element as claimed in claim 10, wherein, in order to support message traffic from the second party to the mobile station the protocol further comprises:

a second e-mail message comprising:

a sender field indicating the second party;

a recipient field indicating the network element and at least indirectly the mobile station;

a second text party; and a second short message, the receiving mobile station of which is determined on the basis of the information included in the recipient field of the second e-mail message and in the allocation request; the second short message substantially comprising said second text part and preferably also the virtual number allocated to the combination.

12. A network element as claimed in claim 10, wherein the sender field of the first e-mail message comprises the virtual number which is the address of the first short message.

13. A network element as claimed in claim 11, wherein the protocol further comprises:

a second allocation request transmitted by the mobile station for allocating an IP network address to the mobile station; and a reply to the second allocation request, sent to the mobile station, the reply indicating whether the allocation of the IP network address was successful or unsuccessful; and that the sender field of the first e-mail message and the recipient field of the second e-mail message comprise the IP network address allocated to the mobile station.

14. A network element as claimed in claim 9, wherein the combination also comprises an identifier of the mobile station transmitting the allocation request.

15. A network element as claimed in claim 9, wherein the network element is a short message service centre.

16. A network element as claimed in claim 9, wherein the network element comprises a short message service centre and a separate extension part functionally attached to the short message service centre.

* * * * *